No. 633,235. Patented Sept. 19, 1899.
G. A. & R. F. DUNN.
CAR AND PORTABLE TURN TABLE.
(Application filed June 12, 1899.)
(No Model.)
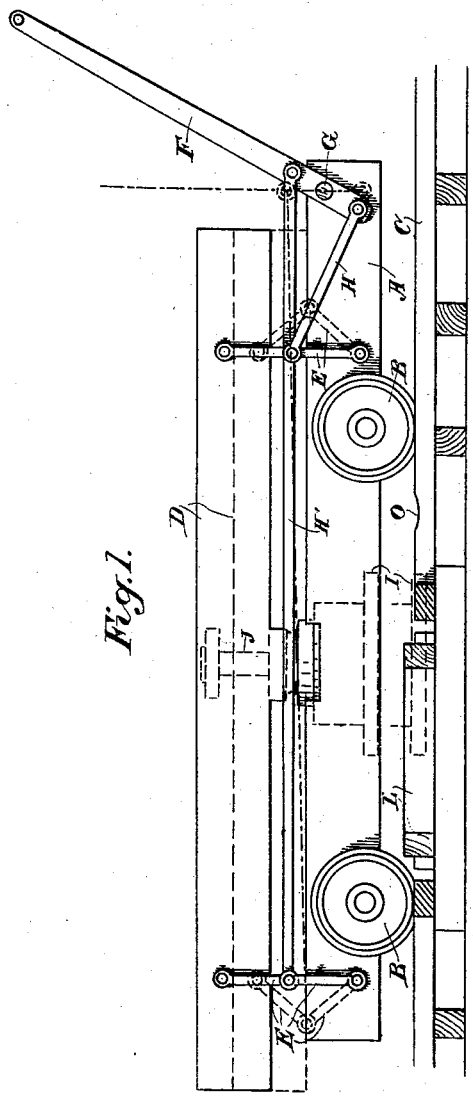
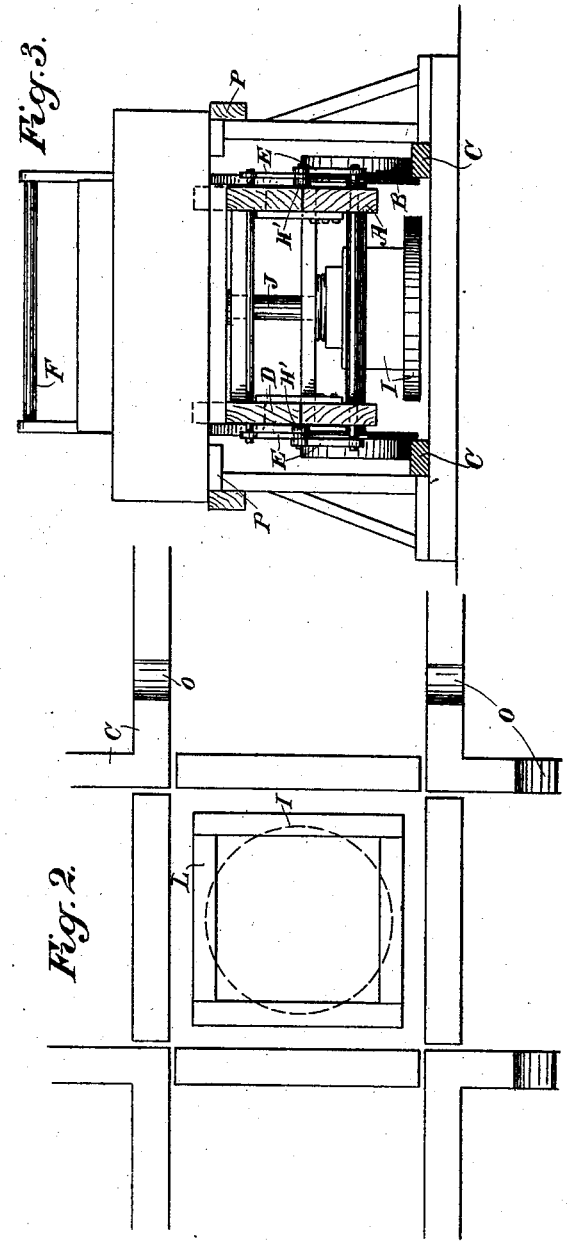
Witnesses,
Inventors,
George A. Dunn
Robert F. Dunn

UNITED STATES PATENT OFFICE.

GEORGE AMBROSE DUNN AND ROBERT FRANKLIN DUNN, OF DINUBA, CALIFORNIA.

CAR AND PORTABLE TURN-TABLE.

SPECIFICATION forming part of Letters Patent No. 633,235, dated September 19, 1899.

Application filed June 12, 1899. Serial No. 720,183. (No model.)

*To all whom it may concern:*

Be it known that we, GEORGE AMBROSE DUNN, a citizen of Canada, and ROBERT FRANKLIN DUNN, a citizen of the United States, residing at Dinuba, county of Tulare, State of California, have invented an Improvement in Cars and Portable Turn-Tables; and we hereby declare the following to be a full, clear, and exact description of the same.

Our invention relates to a car and a portable turn-table attachment which is designed particularly for use in handling fruit or other goods which are to be moved in bulk from place to place. The car is composed of a lower frame mounted upon bearing-wheels, an upper portion with a mechanism by which it may be raised or depressed, and a turn-table attached to and carried thereby, so that it may be raised from the surface when the upper portion of the car is raised and depressed at the proper point to rest upon the surface and raise the whole structure, thus allowing the latter to be turned from its first direction of travel to any other at some angle therewith.

The invention also comprises details of construction, which will be more fully explained by reference to the accompanying drawings, in which—

Figure 1 is a side elevation of a car. Fig. 2 is a plan view of a track-crossing. Fig. 3 is a rear end view of a car.

This car is especially designed for use in handling fruit, in drying, and sulfuring, and in packing-houses, and is so constructed that a load of fruit may be lifted from trestles upon which it is placed and transferred to another place, where it is to be treated or handled, and then again deposited upon trestles, so that the car may be removed.

A is the main frame of the car, mounted upon wheels B, which are adapted to run upon tracks C or other surface.

D is the upper part of the frame, and by means of links E the upper part is movably connected with the lower portion. The upper links have their upper ends connected with the upper portion of the frame D, and the lower links have their lower ends pivoted to the lower portion A. The meeting ends of these links form a knee or knuckle joint, which is bendable, so that the upper frame D can be raised from the lower one or depressed to rest upon it.

F is a handle fulcrumed at G to the lower truck and having links H H', one pair connecting with the knuckle-joint of the links E E and the other rods above the fulcrum-point, connecting with the knuckle-joint of the rear pair of links. By this construction when the handle is pushed up in a vertical position the joints of the links are bent in opposite directions, and the upper frame D of the car is allowed to rest upon the lower one. When the handle is pulled down, the reverse movement takes place, and the levers H H', pressing and pulling, respectively, against the knuckle-joint, force them toward each other, and they thus raise the upper part of the car until the links are approximately in a straight line, when it will be at its highest point. In order to retain the parts in this condition, the knuckle-joints preferably pass the straight line or center and rest against suitable stops, which prevent them going any farther, thus holding the upper portion of the car in a raised position.

I is a turn-table having a vertical shaft J, extending up through timbers which are centrally located on the upper frame D, and this turn-table stands in such relation to the frames that when the upper frame D is raised it lifts the turn-table with it clear of the surface over which the car is to move. When the handle is thrown up and the upper frame is depressed upon the lower one, the turn-table will strike the base L before the frame D has been entirely depressed, and the further movement of the handle will then raise the lower frame A and the wheels clear of the surface, thus allowing the whole apparatus to be turned around to change its direction of travel. When the new direction of travel is reached, the turn-table is again raised, the wheel-frame depressed, and the whole car started off in its new direction.

When used as we have designed the apparatus, we employ tracks C, leading to various points where the fruit or other articles are to be moved. In the present case these tracks are shown crossing each other at right angles, and at the proper point with relation to the central line of intersection are depressions O or stops made in the track, in which the wheels drop when the car reaches the point where the turn is to be made, and the turn-table being then depressed, as before described, the car is turned from one line of tracks to the other. These depressions insure the turn-table being exactly central, so that the wheels will be ready to take the new line of track when the car has been turned into line with it.

In handling fruit, boxes or trays are placed upon trestles P and a load for the car piled thereon, occupying about the space and shape they would be when piled upon the car. These trestles are separated to a slightly-greater width than the width of frame D and at such a height that when the frame D is lowered a little the car can be run under the load which rests on the trestles. The frame D being then raised, the load will be lifted by it and rest upon the frame, which can then be drawn forward until the load is clear of the trestles and transferred to a desirable point. When transferred to a sulfuring or packing house, the car is run beneath similar trestles and the upper part D lowered until the boxes rest upon these trestles, when the car can be withdrawn and the load left upon the trestles. In this way a single car may be in constant use, as it does not have to wait for the load to be placed thereon or removed, and any process which may be applied to the fruit can be carried on without leaving the car at that point. By this construction labor is saved in handling the trays of fruit. The car does not need to be left in the sulfur-house, and it carries its own turn-table, thus obviating the necessity of different turn-tables at points along the track or the expense of the transfer-car. The mechanism is such that the load is easily raised and lowered, and, as before stated, the car can be easily transferred from one track to another.

Having thus described our invention, what we claim as new, and desire to secure by Letters Patent, is—

1. In a car, a wheel-frame, an upper frame connected therewith by links having knuckle-joints, a horizontally-rotating turn-table carried by said upper frame and adapted to elevate the wheel-frame, when the upper frame is depressed, a handle fulcrumed to the lower frame, and rods extending therefrom to the knuckle-joints, whereby the upper frame may be raised by a straight lift.

2. In a car, a wheel-frame and upper frame, links having one end of each pair fulcrumed to the upper frame, and the other to the lower frame, their meeting ends uniting to form knuckle-joints which are movable in opposite directions to raise or lower the upper frame in the straight line, a lever fulcrumed to the wheel-frame with the lower part extending below the fulcrum-point, rods connecting the lower part of the lever with one pair of the knuckle-joints, other rods equidistant from the other pair, whereby said joints are drawn toward each other to raise the upper frame and separated to allow it to descend.

3. In a car, a wheel-frame, and an independent upper frame connected therewith by jointed links, a means whereby said links are moved so as to raise or lower the upper frame, a centrally-disposed turn-table having a vertical shaft connecting it with the upper frame, so that it is lifted from the surface with the upper frame, and is depressed therewith to rest upon the surface and raise the lower frame and wheels clear of the track so that the car may be turned about the table-axis.

4. A car consisting of a main wheel-frame, an upper frame with mechanism by which it may be raised or depressed with relation to the main frame, a horizontally-rotating turn-table having a vertical axis connecting it with the upper frame so that it may be raised clear of the surface when the upper frame is raised and depressed therewith to rest upon the surface and raise the lower frame and wheels, to allow the car to be turned about the central axis and its direction changed.

5. A car consisting of a wheel-frame, lines of track crossing or divergent from each other, upon either of which the car is adapted to travel, a vertically-movable upper frame carrying a horizontally-rotatable turn-table, depressions or stops in the track to receive the wheels when the turn-table arrives over the center of divergence of the tracks, means for depressing the turn-table to rest upon the surface and raise the lower frame to allow the car to be turned from one line of track to the other.

In witness whereof we have hereunto set our hands.

GEORGE AMBROSE DUNN.
ROBERT FRANKLIN DUNN.

Witnesses:
S. K. GREENE,
W. P. BOONE.